United States Patent
Hosokawa et al.

(10) Patent No.: US 6,929,408 B2
(45) Date of Patent: Aug. 16, 2005

(54) CAMERA WITH MOTOR AND GEAR DRIVE SYSTEM

(75) Inventors: Tetsuo Hosokawa, Tokyo (JP); Takuya Hasegawa, Tokyo (JP); Mikio Ogi, Kouchi-Ken (JP); Kenji Kawazura, Tokyo (JP)

(73) Assignee: PENTAX Corporation, Tokyo (JP)

( * ) Notice: Subject to any disclaimer, the term of this patent is extended or adjusted under 35 U.S.C. 154(b) by 0 days.

(21) Appl. No.: 10/778,159

(22) Filed: Feb. 17, 2004

(65) Prior Publication Data

US 2004/0161231 A1 Aug. 19, 2004

(30) Foreign Application Priority Data

Feb. 18, 2003 (JP) ..................................... P2003-040128

(51) Int. Cl.⁷ ............................................. G03B 19/12
(52) U.S. Cl. ...................................... 396/358; 396/418
(58) Field of Search ......................... 396/48, 132, 358, 396/411, 418

(56) References Cited

U.S. PATENT DOCUMENTS

| | | |
|---|---|---|
| 5,079,574 A | 1/1992 | Ueno |
| 5,253,004 A | 10/1993 | Umetsu et al. |
| 6,377,754 B1 * | 4/2002 | Sugita et al. ................ 396/132 |
| 6,529,688 B2 * | 3/2003 | Kaihara et al. ............. 396/132 |
| 2001/0051044 A1 * | 12/2001 | Wakabayashi et al. ......... 396/85 |

* cited by examiner

Primary Examiner—David M. Gray
(74) Attorney, Agent, or Firm—Greenblum & Bernstein, P.L.C.

(57) ABSTRACT

A pinion gear is fixed on a rotating shaft of a motor for supplying a driving force of a plurality of driving mechanisms. A speed reducing gear is engaged with the pinion gear, and a sun gear is engaged with a speed reducing gear. A planet worm includes a spur gear portion and a worm gear portion. The spur gear portion is engaged with the sun gear. The planet worm is supported so as to be rotatable around the shaft of the sun gear. When the planet worm is rotated to be positioned adjacent to the cartridge room, the worm gear portion is engaged with a rewind spur gear of a gear train. The rotational force of the motor is transmitted to a rewinding fork through the gear train, and then the rewind fork is rotated.

10 Claims, 15 Drawing Sheets

CAMERA WITH MOTOR AND GEAR DRIVE SYSTEM

BACKGROUND OF THE INVENTION

1. Field of the Invention

The present invention relates to a camera.

2. Description of the Related Art

Conventionally, a camera, for example a single lens reflex camera, is provided with motors. The motors supply the driving force for driving a shutter, driving a quick return mirror, and driving a diaphragm and so on. The rotational force of the motors is transmitted to a film feeding mechanism, a shutter driving mechanism, a quick return mirror driving mechanism, and a diaphragm driving mechanism, through speed reducing gear trains. The speed reducing gear trains consist of a combination of a plurality of reduction gears. By using the speed reducing gear trains, the rotational force of each motor is decelerated to be suitable for the corresponding driving mechanism and is transmitted to the corresponding driving mechanism.

Recently, cameras are required to be more compact for ease of manipulation and portability. However, since the above-mentioned speed reducing gear trains consist of a combination of a plurality of reduction gears, the speed reducing gear trains are bulky in a direction parallel to the plane of the gears, and in a direction parallel to rotating axes of the gears. On the other hand, in these cameras, a relatively strong driving force is needed for operating the shutter, driving the mirror and winding the film. A small battery and a small motor may be mounted in the cameras to facilitate downsizing, however the driving force which is supplied by a small battery and motor, is small. Accordingly, since a gear train, the speed reduction ratio of which is large, is necessary for lowering the driving force, the gear train is enlarged. Therefore, it is difficult to make the camera compact.

SUMMARY OF THE INVENTION

Therefore, an object of the present invention is to make a compact camera that has a small driving mechanism which is stably controlled, and the speed reducing ratio of which is large.

In accordance with an aspect of the present invention, there is provided a camera comprising: a motor; a first gear train that is engaged with a rewinding fork of a cartridge room, in order to transmit a rotational force of the motor to the rewinding fork; a second gear train that transmits the rotational force to a quick return mirror driving mechanism or a shutter driving mechanism; and a changing mechanism that changes a transmitting path of the rotational force between the first gear train and the second gear train.

The changing mechanism includes: a pinion gear that is fixed on the rotating shaft of the motor; a sun gear to which a rotation of the pinion gear is transmitted; and a planet worm that includes a spur gear portion which is engaged with the sun gear, and a worm portion which is unitarily rotated with the spur gear portion and which is able to selectively move to one of the first gear train and the second gear train in accordance with a rotational direction of the sun gear.

Preferably, the changing mechanism includes a guiding mechanism that guides the movement of the planet worm and a lock mechanism that restrains the movement of the planet worm.

Preferably, the camera further comprises a controller that controls the motor and the lock mechanism. The controller controls the release of the lock mechanism when the planet worm is moved, the planet worm is guided by the guiding mechanism in order to change a gear train to be connected to the planet worm. The controller controls the transmission of the rotational force of the motor to the rewinding fork of the cartridge room and controls the performance of a film rewinding, by rotating the motor in a first direction in a first state in which the planet worm is connected to the first gear train and the movement of the planet worm is restrained by the lock mechanism. The controller controls the transmission of the driving force to the quick return mirror driving mechanism or the shutter driving mechanism through the second gear train, by rotating the motor in a second direction opposite to the first direction in a second state in which the planet worm is connected to the second gear train and the movement of the planet worm is restrained. The controller controls the transmission of the driving force to the diaphragm driving mechanism and carries out a preview operation by rotating the motor in the first direction in the second state.

More preferably, the guiding mechanism includes a guide board in which a slit, for guiding a rotating shaft of the planet worm when the planet worm is moved, is formed.

The lock mechanism includes: a lever that includes first and second stoppers for limiting the movement of the rotating shaft of the planet worm; and a lever driving mechanism that drives the lever such that the first and second stoppers are moved to a first position at which the first and second stoppers prevent the movement of the rotating shaft in the slit and a second position at which the movement of the rotating shaft in the slit is not prevented by the first and second stoppers.

The planet worm is moved to a position at which the planet worm is connected to the first gear train, when the lever is driven by the lever driving mechanism such that the first stopper is removed from the slit and the motor is rotated in the first direction, and the planet worm is moved to a position at which the planet worm is connected to the second gear train, when the lever is driven by the lever driving mechanism such that the second stopper is removed from the slit and the motor is rotated in the second direction.

Preferably, the second gear train includes: a worm gear that includes a spur gear portion which is be able to engage with the spur gear portion of the planet worm, and a worm wheel portion which is unitarily formed with this spur gear portion; a gear that is engaged with the worm wheel portion of the worm gear; and a cam gear that is engaged with the gear and includes a cam plane which is formed on its rotating shaft.

The cam gear is connected to a third gear train for transmitting a driving force to the quick return mirror driving mechanism and the shutter driving mechanism, and is connected to the diaphragm driving mechanism.

The rotational movement of the motor in the second direction, which has been transmitted by the changing mechanism, the worm gear, and the gear, is transmitted to the third gear train and the diaphragm driving mechanism by the cam gear, and the rotational movement of the motor in the first direction, which has been transmitted by the changing mechanism, the worm gear, and the gear, is transmitted to the diaphragm driving mechanism by the cam gear.

More preferably, the lock mechanism includes a lever movement limiting mechanism that limits a range of movement of the lever which is driven by the lever driving mechanism.

According to the present invention, the worm portion is formed on the planet worm which is one of the components of the changing mechanism, and the rotational force of the motor is transmitted to the first gear train through the worm portion. Accordingly, a large reducing ratio can be obtained by a small structure. Therefore, the rewind shaft can be stably driven and further the camera can be more compact.

Since the rotational force of the motor is transmitted to the plurality of driving mechanisms using the changing mechanism, the efficiency in utilizing the motor is improved. Namely, it is not necessary to provide a driving source for each of the driving mechanisms, so that the downsizing of the camera is more efficiently realized.

If the worm gear is used in the second gear train to connect with the planet worm gear, the rotational force of the motor can be transmitted to the driving mechanisms of the quick return mirror and the shutter using a large reducing ratio, and also the second gear train can be compact. Further, when the planet worm gear is not connected with the second gear train, the second gear train is not rotated based on the engagement of the worm gear and the worm wheel gear. Accordingly, without an extra friction mechanism and so on, other than the transmitting mechanisms, the rotation of gears in the second gear train which is caused by an expected vibration, is prevented. Namely, the application of the worm gear is more suitable for the transmitting mechanism.

BRIEF DESCRIPTION OF THE DRAWINGS

The objects of the present invention will be better understood from the following description, with reference to the accompanying drawings, in which.

DESCRIPTION OF THE PREFERRED EMBODIMENTS

Figure 1:
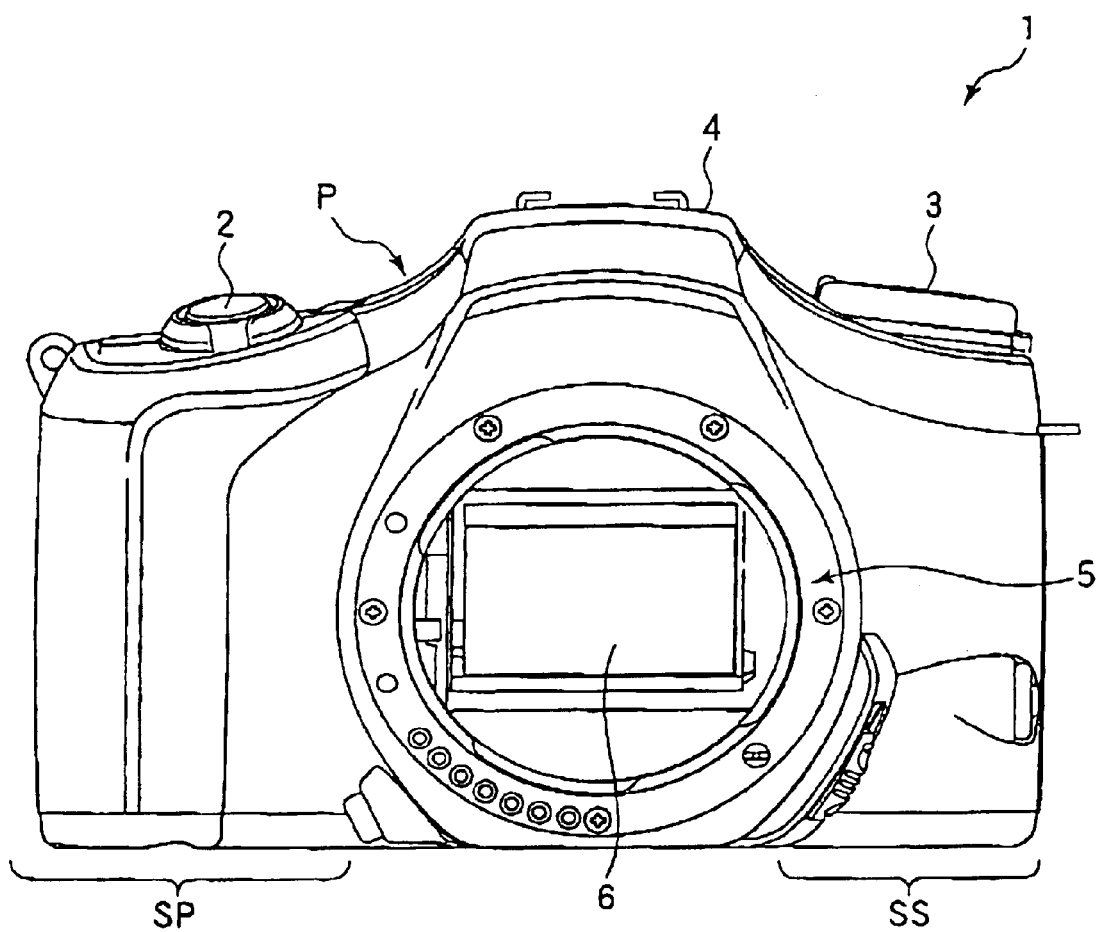
FIG. 1 is a front view of a camera body of a single lens reflex camera to which an embodiment according to the present invention is applied.

The present invention will now be described with reference to an embodiment shown in the drawings.

Figure 2:
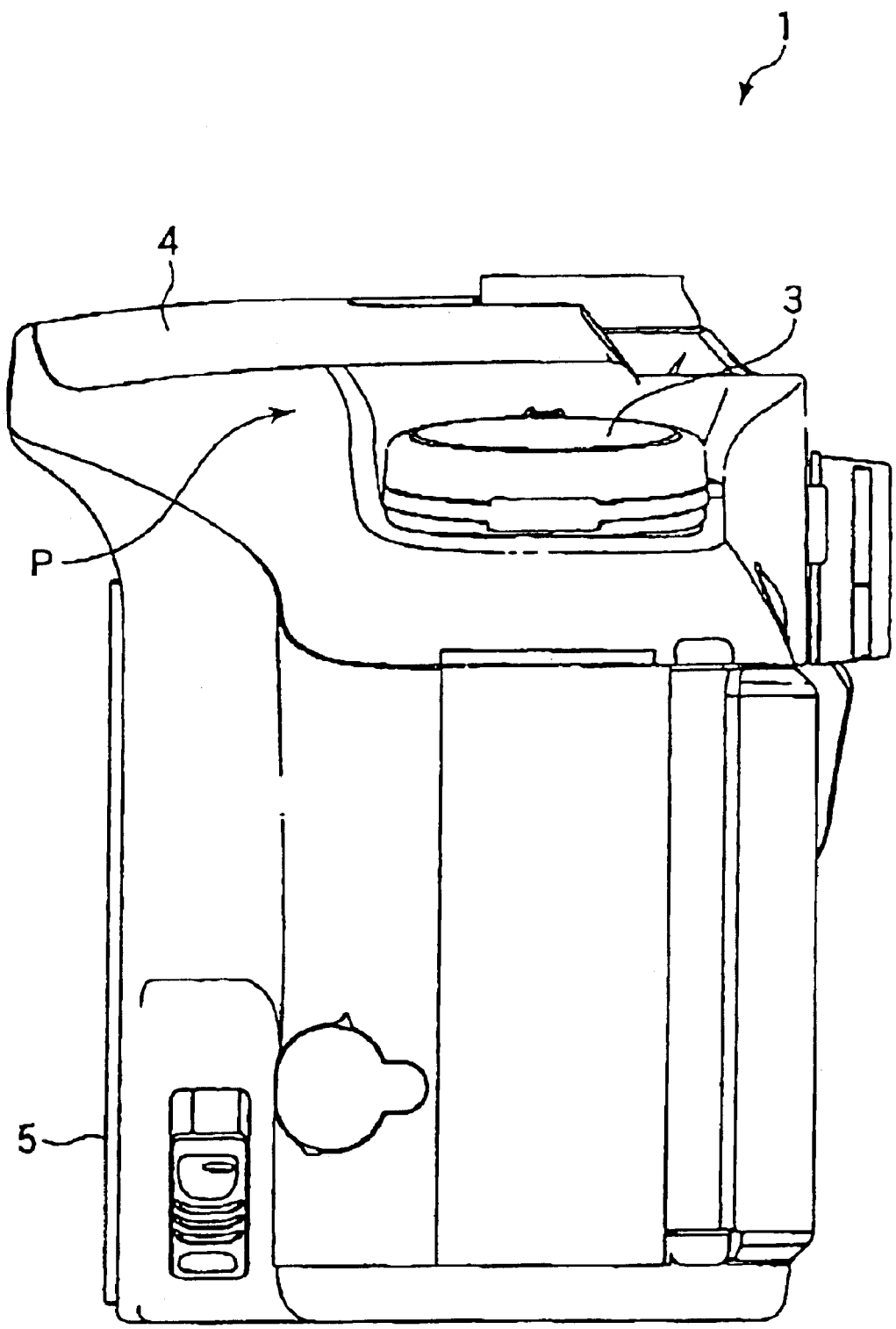
FIG. 2 is a side view of the camera body, viewed at the right side of FIG. 1.

FIG. 1 is a front view of a camera body 1 of a single lens reflex camera to which an embodiment according to the present invention is applied. FIG. 2 is a side view of the camera body 1, viewed from the right side of FIG. 1.

An upper casing plate P is placed on the upper side of the camera body 1. A release button 2 is provided on the plate P, being positioned at the left side in FIG. 1. A setting dial 3 for setting various modes is provided on the plate P, being position at the right side in FIG. 1. A flash case 4 is positioned at the center of the plate P. A flash (not shown) is built in the flash case 4, being positioned at the front side end of the camera body 1. The flash case 4 is rotatably supported by a shaft which is provided at the back side end of the camera body 1. When the flash is not used, the flash case 4 is held at a storage position as shown in FIG. 1. When the flash is used, the flash case 4 is rotated around the above-mentioned shaft, the front side end in which the flash is built is moved upwardly, and the flash case 4 is held in an operating position. A lens mount 5 is provided at the center of the camera body 1. A quick return mirror 6 is provided in the camera body 1, being on an optical axis of a lens barrel which is mounted on the lens mount 5.

Figure 3:
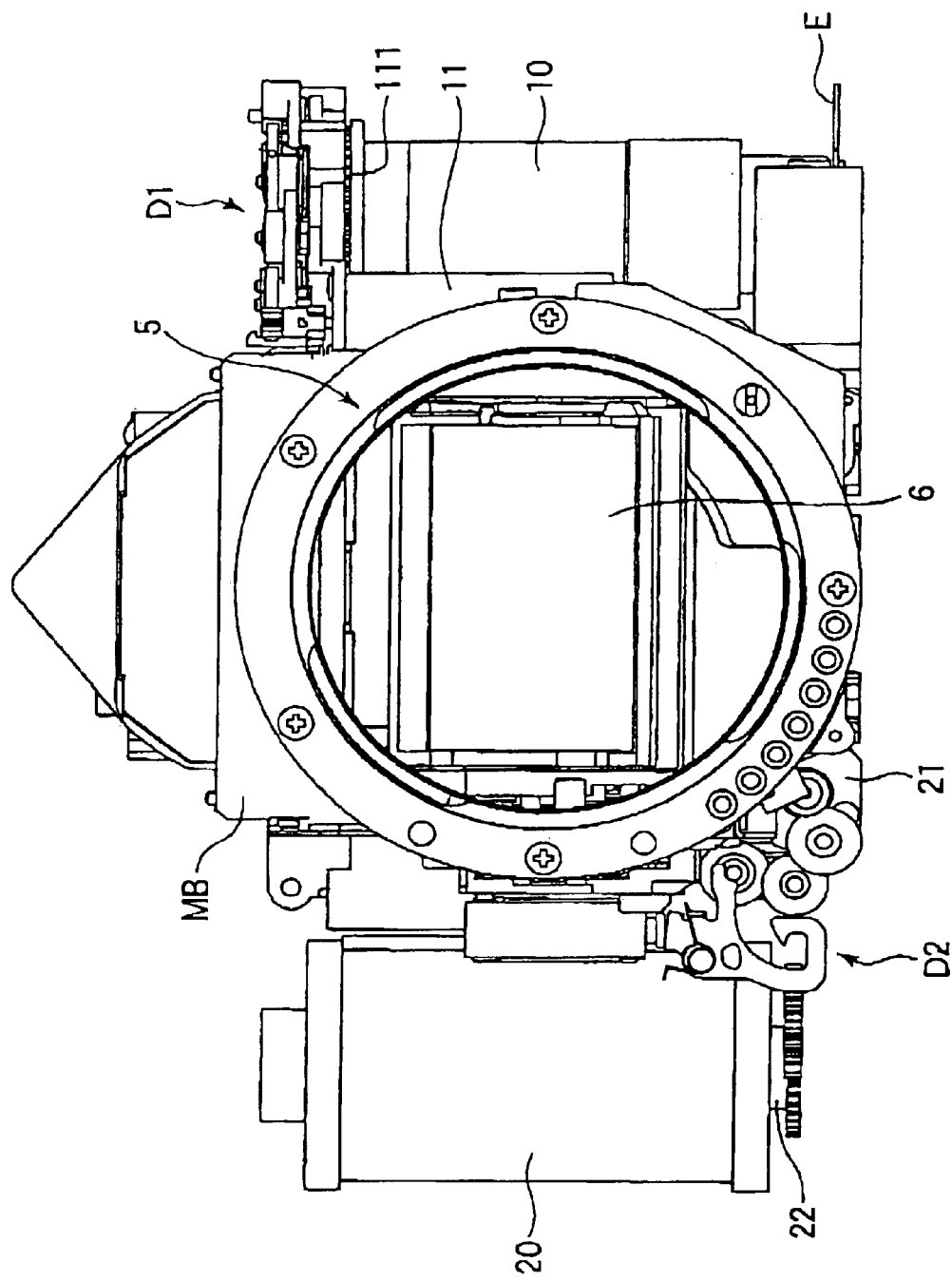
FIG. 3 is a front view of an inside structure of the camera body.
Figure 4:
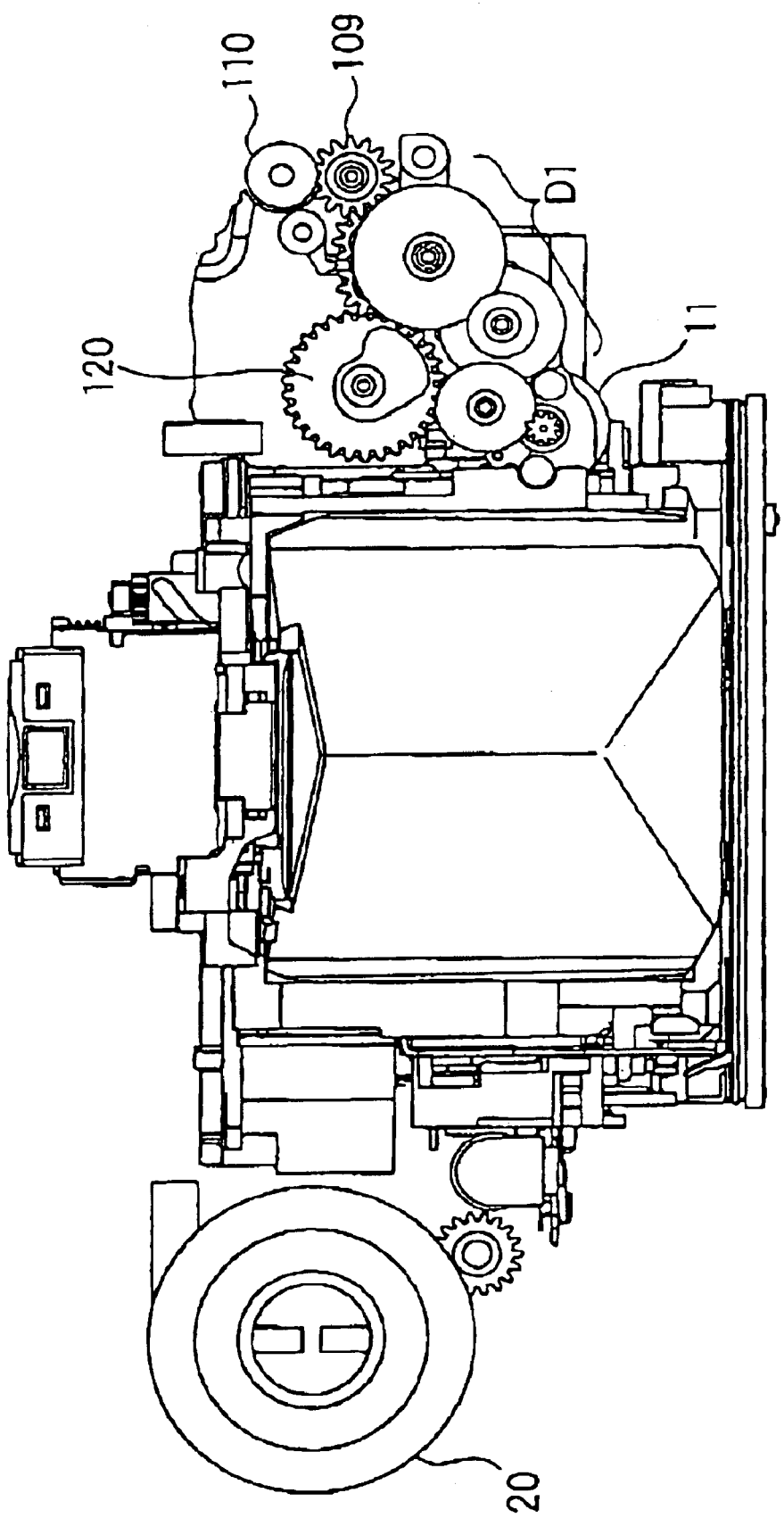
FIG. 4 is a plane view of the inside structure.
Figure 5:
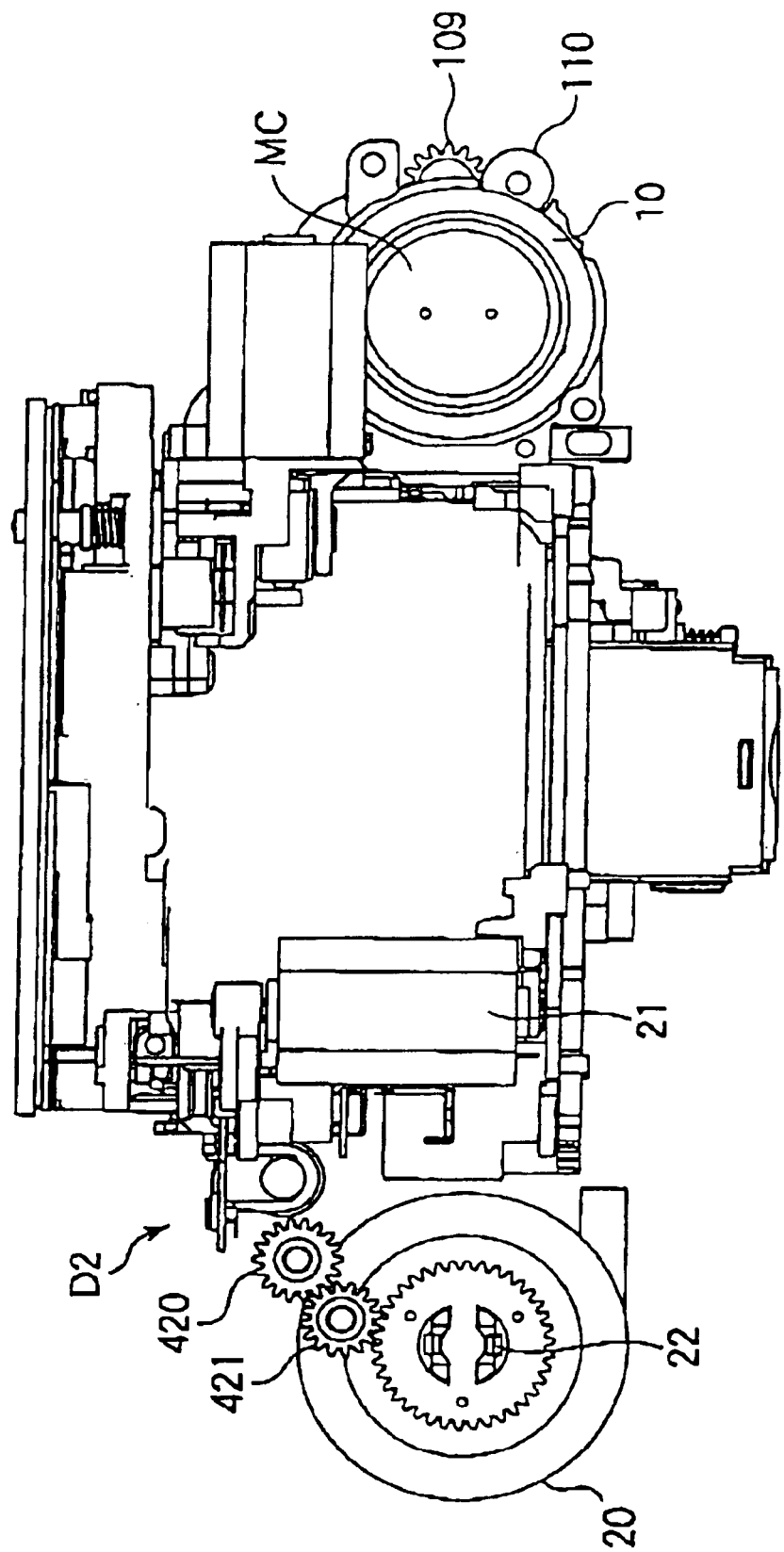
FIG. 5 is a bottom view of the inside structure.

FIG. 3 is a front view of an inside structure of the camera body 1, FIG. 4 is a plane view of the inside structure, and FIG. 5 is a bottom view of the inside structure. A first motor 11 is provided adjacent to a spool 10. The rotation of the first motor 11 is optionally transmitted to an up-down mechanism of the flash or the spool 10, through a first speed reducing mechanism D1. The transmission of the rotation of the first motor 11 to the spool 10 is performed through a friction gear 109, a connecting gear 110, and a spool gear 111 of the spool 10. Further, the rotation of the first motor 11 is transmitted to the up-down mechanism of the flash, namely the driving mechanism of the flash case 4, through a cam gear 120. With respect to the rotation of the first motor 11, a first change mechanism of the first speed reducing mechanism D1 changes the transmission of the rotational force between the spool 10 and the up-down mechanism. A second motor 21 is provided adjacent to the bottom of the cartridge room 20. A controller CR (see FIG. 8) controls the start and stop of rotation and the rotational directions of the first motor 11 and the second motor 21. Note that, the controller CR is explained later.

The rotation of the second motor 21 is transmitted to a rewinding fork 22 of the cartridge room 20 and driving mechanisms of the quick return mirror 6, a diaphragm (not shown) and a shutter (not shown). With respect to the rotation of the second motor 21, a second change mechanism 23 (see FIG. 6) of a second transmitting mechanism D2 changes the transmission of the rotational force between the rewinding fork 22 and the driving mechanisms. Note that, the second change mechanism 23 is explained later.

Further, as shown in FIG. 5, a main capacitor MC, which is cylindrical, is inserted in the spool 10 which is cylindrical and hollow. The main capacitor MC stores electric charge so that an arc tube (not shown) of a flash light emitting unit (not shown) can emit light. A substrate E (see FIG. 3) is mounted at the bottom end side of the main capacitor MC. Controlling of the light emitted from the flash light emitting unit and controlling of the charging of the main capacitor MC and so on are performed by the substrate E.

Namely, in the direction along the rotating axis of the spool 10 (in the up and down direction of FIG. 3), the first speed reducing mechanism D1 and the flash substrate E are situated, with the spool 10 between them. The mechanism D1 is situated at the upper end side (the upper plate P of the camera body 1) of the spool 10, and the substrate E is situated at the lower end side (the bottom side of the camera body 1) of the spool 10. Note that, the substrate E is omitted in FIG. 5.

Figure 6:
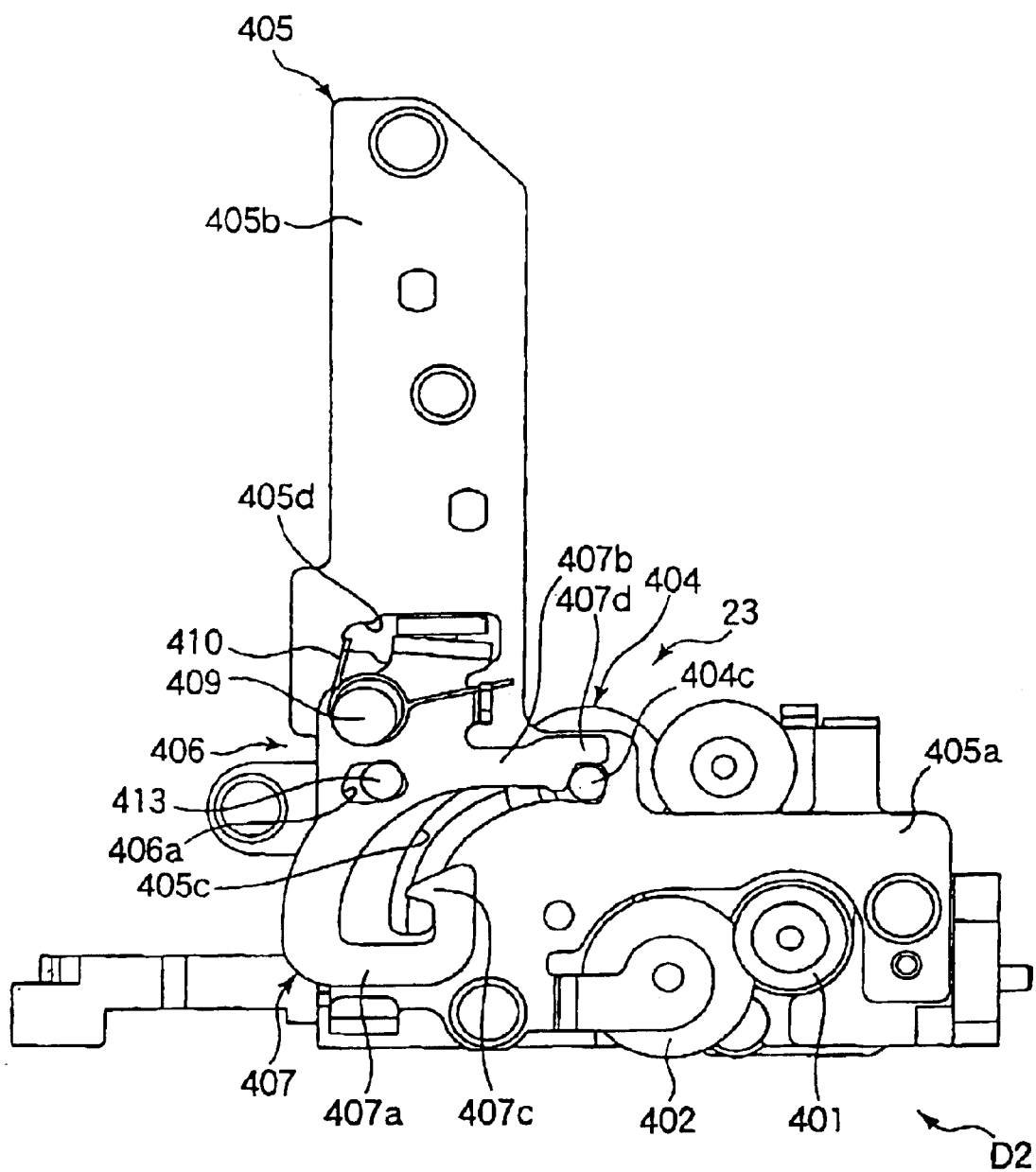
FIG. 6 is an enlarged front view of a second speed reducing mechanism.
Figure 7:
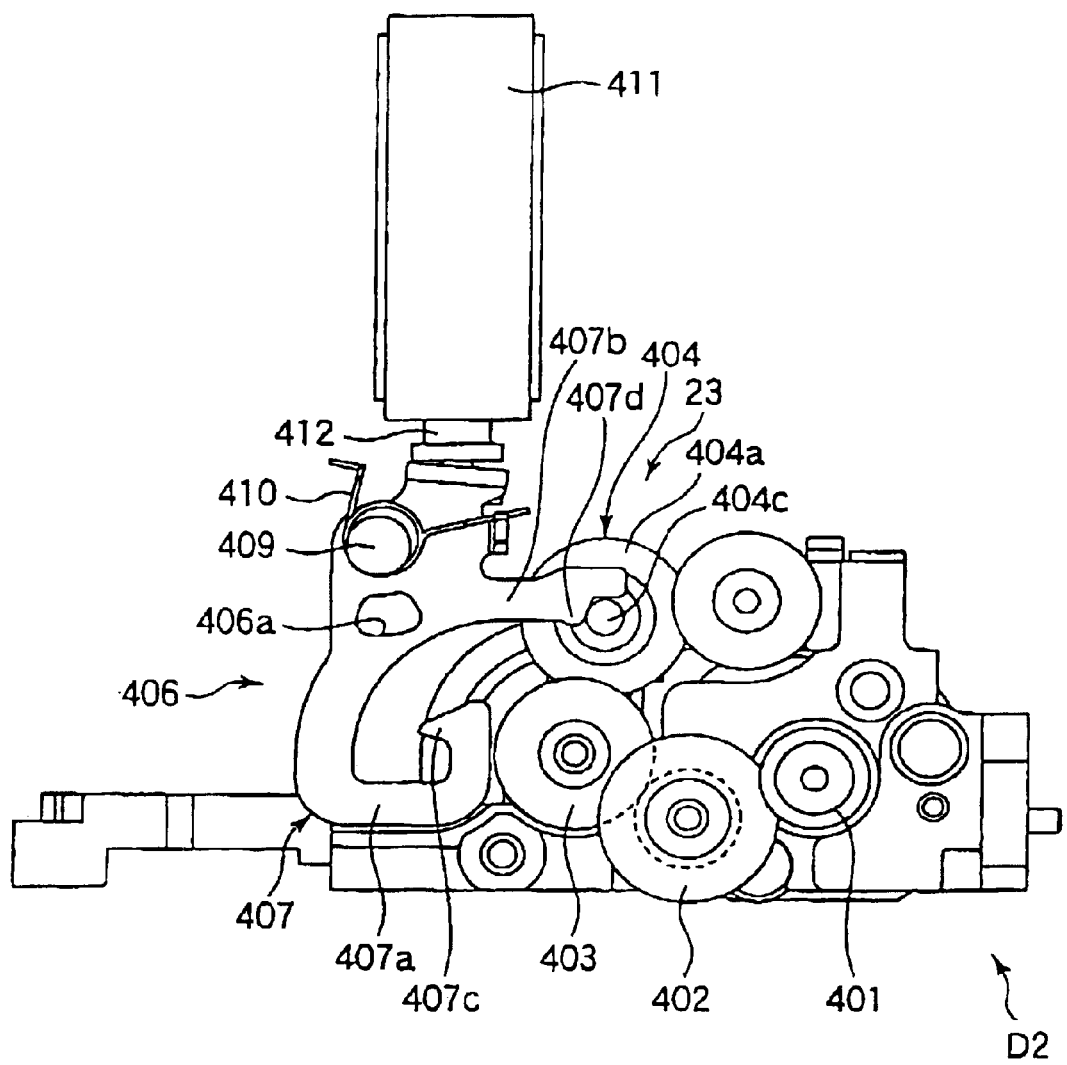
FIG. 7 is an enlarged view of the second speed reducing mechanism, where some components are omitted.
Figure 8:
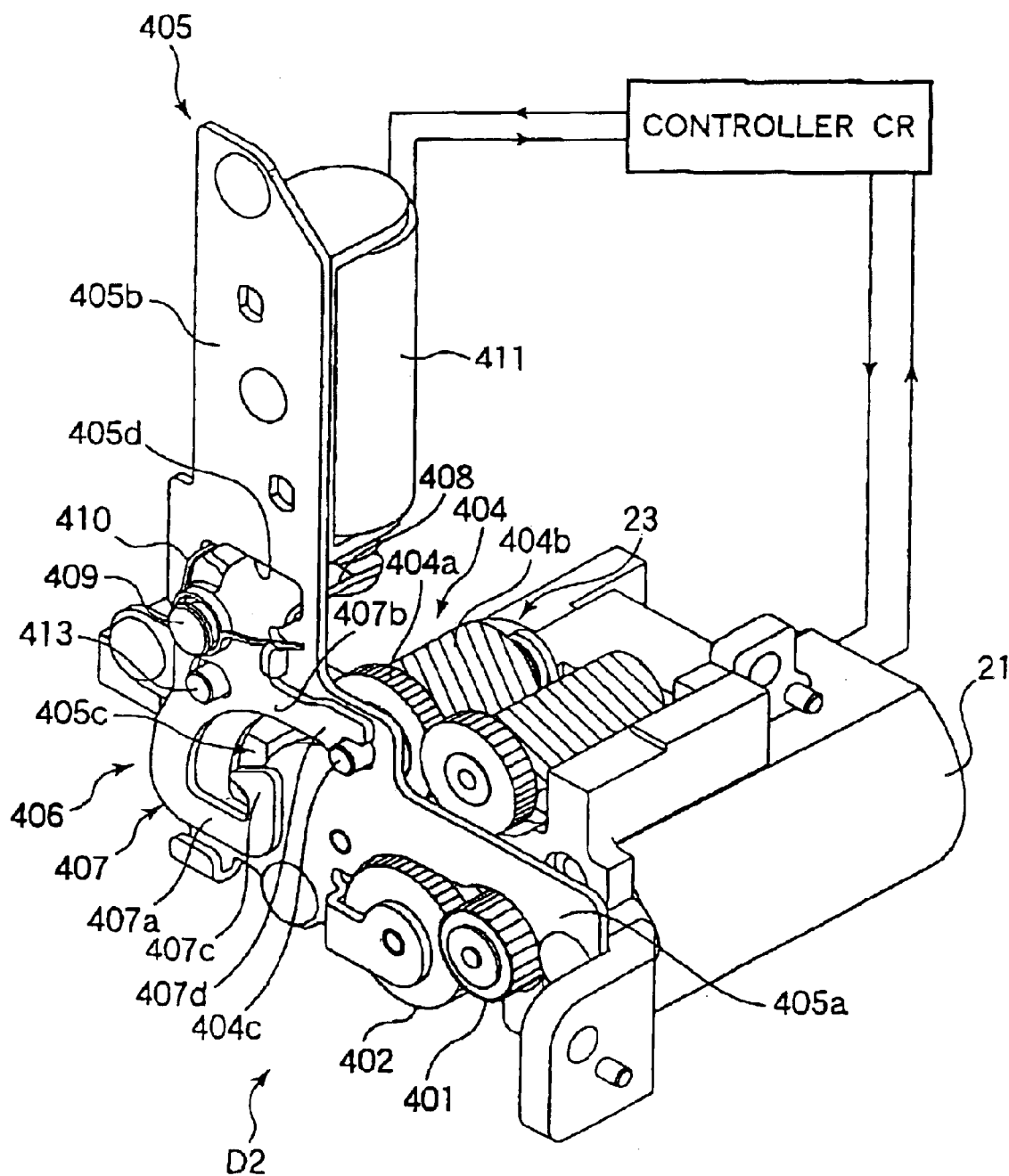
FIG. 8 is a perspective view of the second speed reducing mechanism.
Figure 9:
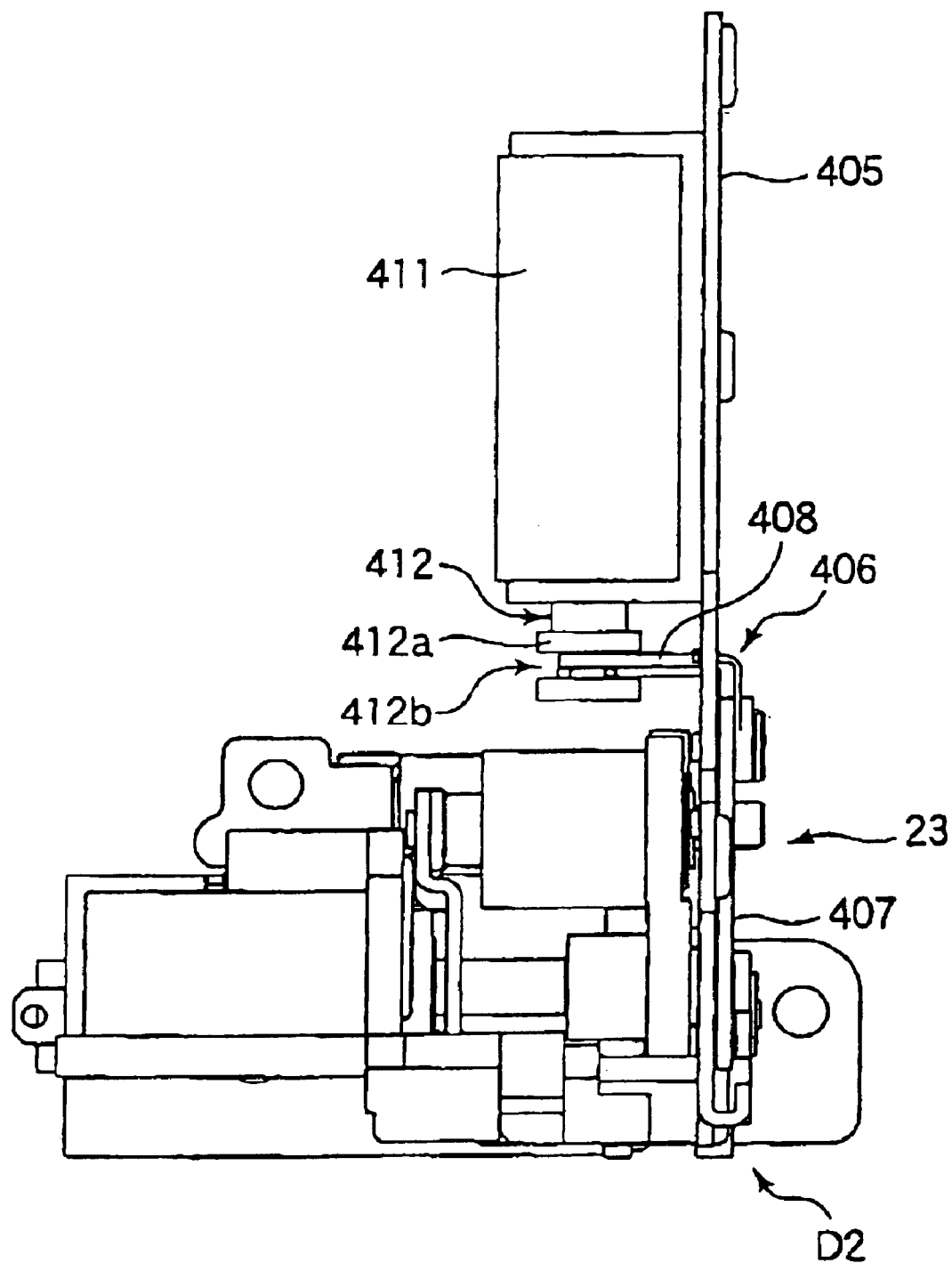
FIG. 9 is a side view of the second speed reducing mechanism, viewed from the left side of FIG. 6.

FIG. 6 is an enlarged front view of a second speed reducing mechanism D2. FIG. 7 is an enlarged front view of the mechanism D2, in which some members are omitted. FIG. 8 is a perspective view of the mechanism D2. FIG. 9 is a side view of the mechanism D2, from the left side of FIG. 6. A pinion gear 401 is fixed to a rotating shaft of a second motor 21 (see FIG. 8). A reduction gear 402 is engaged with the pinion gear 401, and a sun gear 403 (see FIG. 7) is engaged with the reduction gear 402. Namely, the rotation of the second motor 21 is transmitted to the sun gear 403, with its speed being reduced through the pinion gear 401 and the reduction gear 402, at a predetermined speed reduction ratio. Further, the rotation of the sun gear 403 is transmitted to a second change mechanism 23 which includes a planet worm 404.

As shown in FIG. 8, the planet worm 404 includes a spur gear portion 404a and a worm portion 404b. The spur gear portion 404a is engaged with the sun gear 403 (see FIG. 7). The planet worm 404 is supported so as to be rotatable around the central axis of the sun gear 403. Accordingly, in accordance with the rotation of the sun gear 403, the planet worm 404 is moved in the clockwise or counterclockwise directions in FIGS. 6 and 7 around the central axis of the sun gear 403.

A leading board 405 is provided in front of the spur gear portion 404a. The shape of the board 405 is an L-figure, including two arm portions 405a and 405b. At the corner where the arm portions 405a and 405b cross, a slit 405c, which is arc shaped, is formed. When the planet worm 404 is moved, the central shaft 404c of the planet worm 404 is led by the slit 405c. The planet worm 404 is situated such that the end of the central shaft 404c exists in the slit 405c. When the planet worm 404 is moved in accordance with the rotation of the sun gear 403, the central shaft 404c is led by the slit 405c. Accordingly, the planet worm 404 is smoothly moved. Note that, in FIG. 7, the leading board 405 is omitted in order to clearly show the structure of the above-mentioned gear train.

In the leading board 405, a lever 406 is provided adjacent to the slit 405c. The lever 406 includes a stopper portion 407 and a driven portion 408 (see FIGS. 8 and 9). The stopper portion 407 is parallel to the leading board 405, and the driven portion 408 is perpendicular to the leading board 405. The portions 407 and 408 are unitarily formed. The stopper portion 407 is situated so as to face a plane, of the leading board 405, opposite to a plane on which the above-mentioned gear train is situated. The driven portion 408 penetrates through a hole 405d of the board 405 and extends to the side at which the above-mentioned gear train is provided. The lever 406 is supported by a supporting shaft 409 provided on the board 405 so as to be rotatable around the shaft 409.

The stopper portion 407 includes two arms 407a and 407b. Stopper pieces 407c and 407d are respectively formed at the end of the arms 407a and 407b. The stopper pieces 407c and 407d are formed in order to stop the movement of the central shaft 404c of the planet worm 404. Namely, when the central shaft 404c is positioned at one end, of the slit 405c, which is adjacent to the cartridge room 20 (see FIG. 3), the stopper piece 407c can stop the movement of the central shaft 404c along the slit 405c. Further, when the central shaft 404c is positioned at another end, of the slit 405c, which is adjacent to the lens mount 5 (see FIGS. 1 and 3), the stopper piece 407d can stop the movement of the central shaft 404c along the slit 405c. FIGS. 7 and 8 show that the central shaft 404c and the stopper piece 407d are engaged and the movement of the central shaft 404c, namely the movement of the planet worm 404, is restrained. Note that, the details of the positioning of the central shaft 404c are explained later.

A coil spring 410 is wound around the outer surface of the supporting shaft 409. One end of the coil spring 410 is engaged with the hole 405d of the leading board 405, and another end of the coil spring 410 is engaged with a projecting piece formed on the stopper portion 407 of the lever 406. Accordingly, the coil spring 410 urges the lever 406 in the clockwise direction in FIG. 6, at all times.

A solenoid 411 is provided at the arm portion 405b of the leading board 405, being positioned on the plane of the side at which the above-mentioned gear train is provided. A plunger 412 is provided in the solenoid 411. An end 412a of the plunger 412 is formed such that its diameter is larger than that of the other portions of the plunger 412. The end 412a has a groove 412b formed in the circumference direction. As shown in FIG. 9, an end of the driven portion 408 of the lever 406 is positioned in the groove 412b.

The controller CR controls the starting and stopping of the electric supply to the solenoid 411, the starting and stopping of the rotation of the second motor 21, and further, it controls the rotational direction of the motor 21.

With reference to FIG. 7 and FIGS. 9 through 12, the movement of the planet worm 404 and the positioning of the central shaft 404c in accordance with the movement of the planet worm 404 are explained. Note that, the leading board 405 is omitted in FIG. 7 and FIGS. 10 through 12 to clearly show the movement of the planet worm 404.

Figure 10:
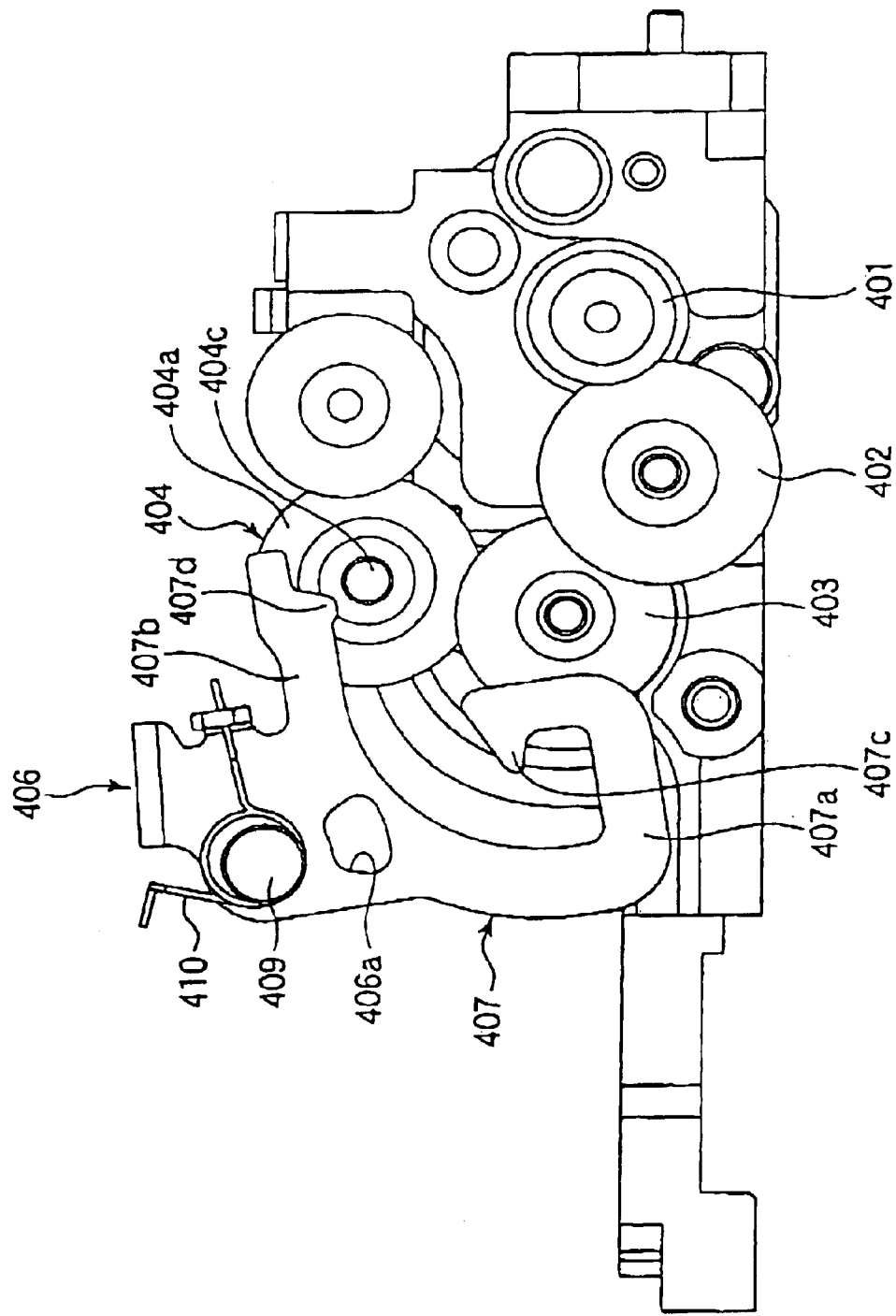
FIG. 10 is an enlarged front view of a second change mechanism, showing an electrically energized solenoid, and a planet worm gear, positioned such that the rotation of a second motor is transmitted to a shutter charge lever, a diaphragm control lever, and a mirror driving lever.

When the solenoid 411 is electrically energized by the control of the controller CR, the plunger 412 is upwardly moved in FIG. 9. In accordance with this movement of the plunger 412, the driven portion 408, of the lever 406, which is in the groove 412b of the plunger 412, is upwardly driven. Accordingly, the lever 406 is rotated around the supporting shaft 409 in the counterclockwise direction in FIG. 7 against the urging force of the coil spring 410. Then, the engagement between the central shaft 404c of the planet worm 404 and the stopper piece 407d is released, as shown in FIG. 10, so that the planet worm 404 becomes movable along the slit 405c of the leading board 405. Namely, the stopper piece 407d is moved to a position at which the movement of the central shaft 404c along the slit 405c is not prevented by either the stopper piece 407d or 407c.

When the second motor 21 is rotated in the reverse direction based on the control of the controller CR in this situation, the pinion gear 401 is rotated in the counterclockwise direction in FIG. 7. The rotation of the pinion gear 401 is transmitted to the sun gear 403 through the speed reduction gear 402, so that the sun gear 403 is rotated in the counterclockwise direction. Accordingly, the planet worm 404 is moved to a position adjacent to the cartridge room 20 through the spur gear portion 404a which is engaged with the sun gear 403, and the planet worm 404 is positioned as shown in FIG. 11.

Figure 11:
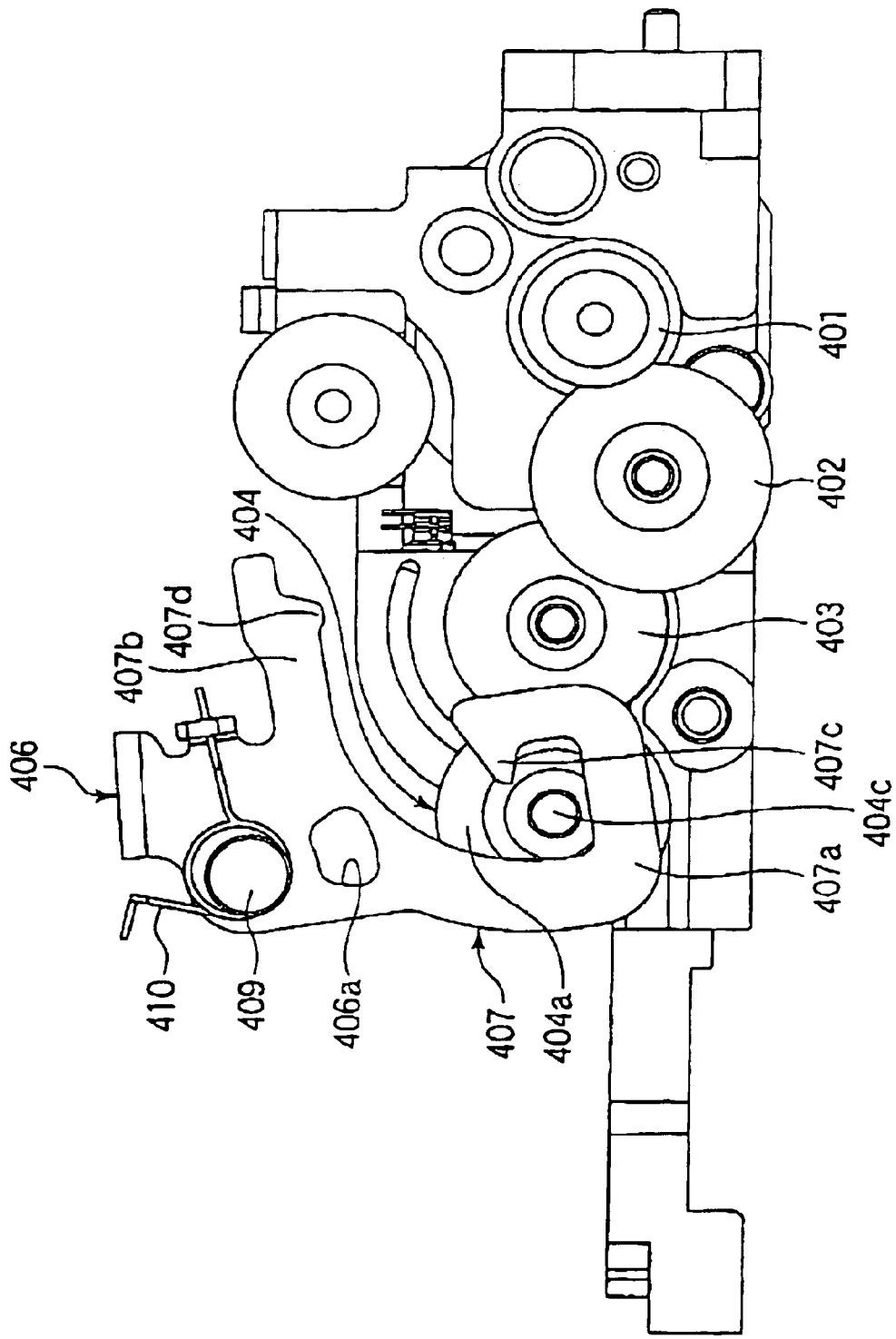
FIG. 11 is an enlarged front view of the second change mechanism, showing an electrically energized solenoid, and the planet worm gear, positioned such that the rotation of the second motor is transmitted to a rewinding fork.

When the solenoid 411 is electrically deenergized based on the control of the controller CR in the situation of FIG. 11, the plunger 412 returns to the original position. In accordance with the movement of the plunger 412, the lever 406 is rotated in the clockwise direction around the supporting shaft 409, and then the stopper piece 407c of the lever 406 and the central shaft 404c of the planet worm 404 are engaged. Namely, the stopper piece 407c is moved to a position at which the stopper piece 407c and thereby the stopper piece 407d prevent the movement of the central shaft 404c along the slit 405c. Accordingly, the planet worm 404 is fixed at the position shown in FIG. 12.

Figure 12:
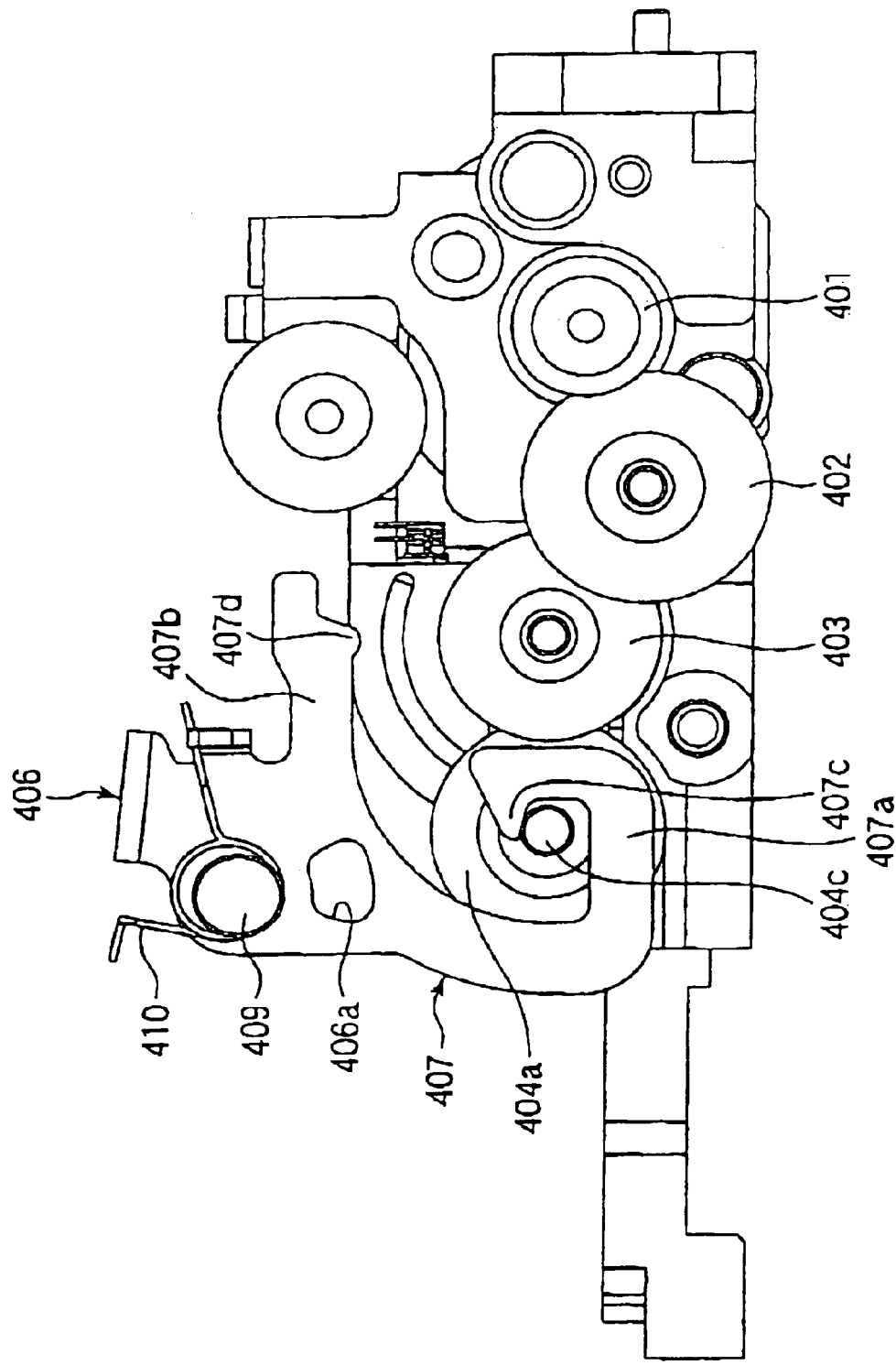
FIG. 12 is an enlarged front view of the second change mechanism, showing an electrically deenergized solenoid, and the planet gear, positioned such that the rotation of the second motor is transmitted to the rewinding fork.

When the solenoid 411 is electrically energized based on the control of the controller CR in the situation of FIG. 12, the lever 406 is rotated in the counterclockwise direction around the supporting shaft 409 in accordance with the movement of the plunger 412, and the engagement between the stopper piece 407c and the central shaft 404c is released (see FIG. 11). When the second motor 21 is rotated in the forward direction based on the control of the controller CR, and the pinion gear 401 is rotated in the clockwise direction, in this situation, the rotation of the second motor 21 is transmitted to the sun gear 403 through the speed reduction gear 402, and the sun gear 403 is rotated in the clockwise direction. Accordingly, the planet worm 404 is moved to the position adjacent to the lens mount 5 through the spur gear 404a which is engaged with the sun gear 403, so that the planet worm 404 is moved to the position adjacent to the lens mount 5 and positioned as shown in FIG. 10.

When the solenoid 411 is electrically deenergized based on the control of the controller CR in the situation of FIG. 10, the plunger 412 returns to the original position. In accordance with the movement of the plunger 412, the lever 406 is rotated in the clockwise direction around the supporting shaft 409, and then the stopper piece 407d and the central shaft 404c engage. Accordingly, the planet worm 404 is fixed at the position as shown in FIG. 7.

An engaging hole 406a is formed in the lever 406, being adjacent to the central shaft 409. A projecting stopper 413 which is unitarily formed with the leading board 405 is penetrated through the hole 406a (see FIG. 8). Due to the engagement between the stopper 413 and the hole 406a, the lever 406 is prevented from being excessively rotated and moved while the solenoid 411 is electrically energized.

Figure 13:
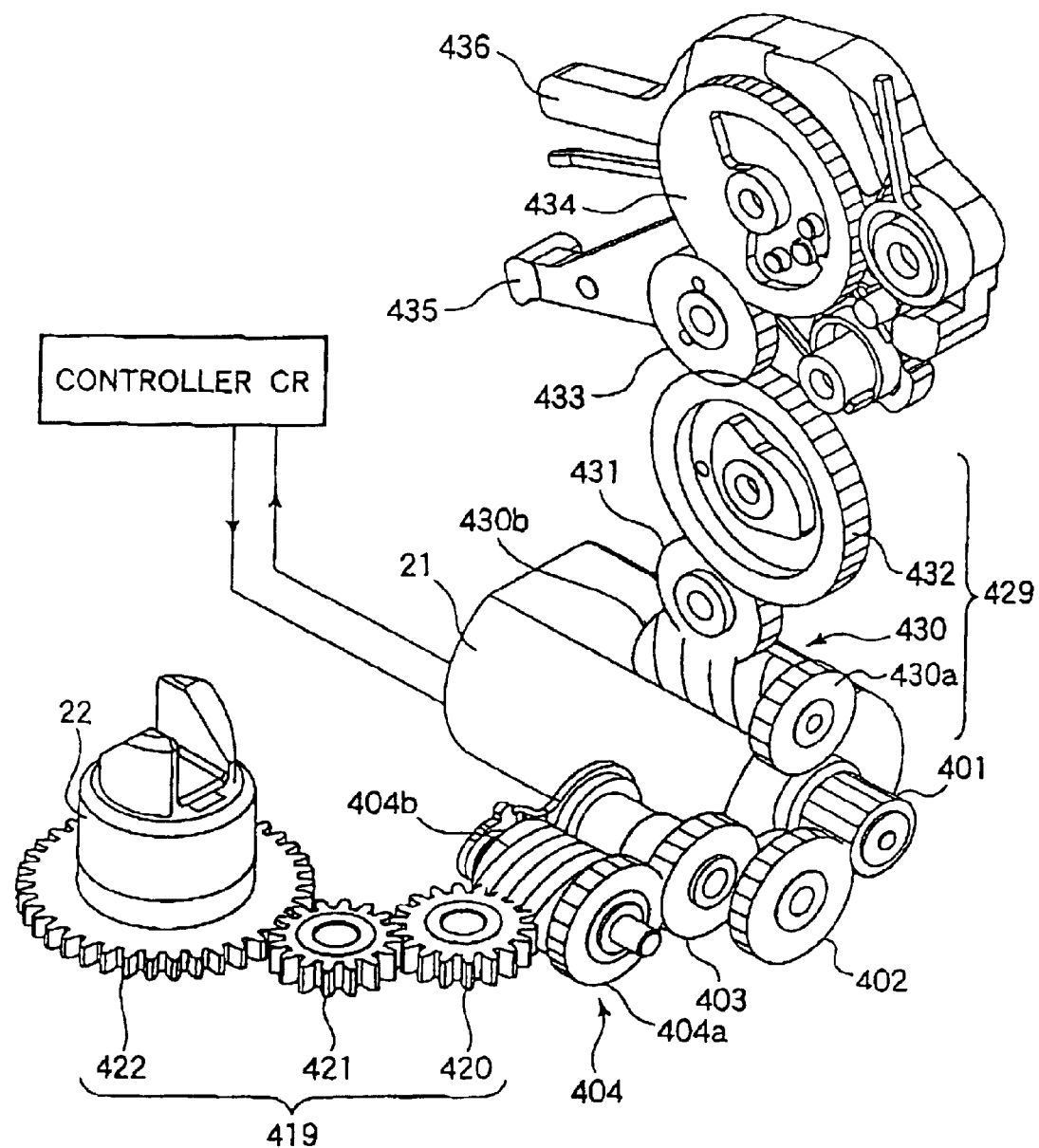
FIG. 13 is a perspective view which shows a gear train of the second speed reducing mechanism and a gear train for rewinding a film, when the film is rewound.

When the planet worm 404 is fixed at the position as shown in FIG. 12, namely at the position adjacent to the cartridge room 20, the worm portion 404b of the planet worm 404 is engaged with a rewind helical gear 420 (wheel gear) of a first gear train 419 for rewinding the film, as shown in FIG. 13. The first gear train 419 is composed of the rewind helical gear 420, a rewind idle gear 421, and a rewind fork gear 422. The rewind idle gear 421 is engaged with the rewind helical gear 420, and the rewind fork gear 422 is engaged with the rewind idle gear 421. The rewind fork gear 422 is coaxial with the rewinding fork 22 of the cartridge room 20.

The rotation of the second motor 21 is transmitted to the rewinding fork 22 through the gear train of the second change mechanism 23 and the first gear train 419, and the rewinding fork 22 is rotated. In this embodiment, in the situation where the worm portion 404b of the planet worm 404 is engaged with the rewind helical gear 420, the second motor 21 is controlled by the controller CR so as to be rotated only in the counterclockwise direction. In other words, while the worm portion 404b is engaged with the rewind helical gear 420, the controller CR controls the drive of the second motor 21 such that the rewinding fork 22 is rotated only in the direction of rewinding the film.

As described above, the rotational speed of the rewind helical gear 420 is decelerated by the worm portion 404b of the planet worm 404. A larger speed reducing ratio than that obtained using a speed reducing mechanism which includes a plurality of spur gears, is obtained by a single component, the planet worm 404. Accordingly, the second motor 21 can be compact. Namely, both the speed reducing mechanism and the driving source (the second motor 21) can be compact.

In this situation where the film is rewound, a spur gear portion 430a of a charge worm gear 430 is not engaged with the spur gear portion 404a of the planet worm 404. The worm wheel portion 430b has a relatively large deceleration. Therefore, if an external force of some extent is added to the shutter charge lever 435 and the mirror driving lever 436, the worm wheel portion 430b is not rotated. Accordingly, the levers 435 and 436 can be stably held at a proper position corresponding to the situation, without utilizing an extra lock mechanism.

Figure 14:
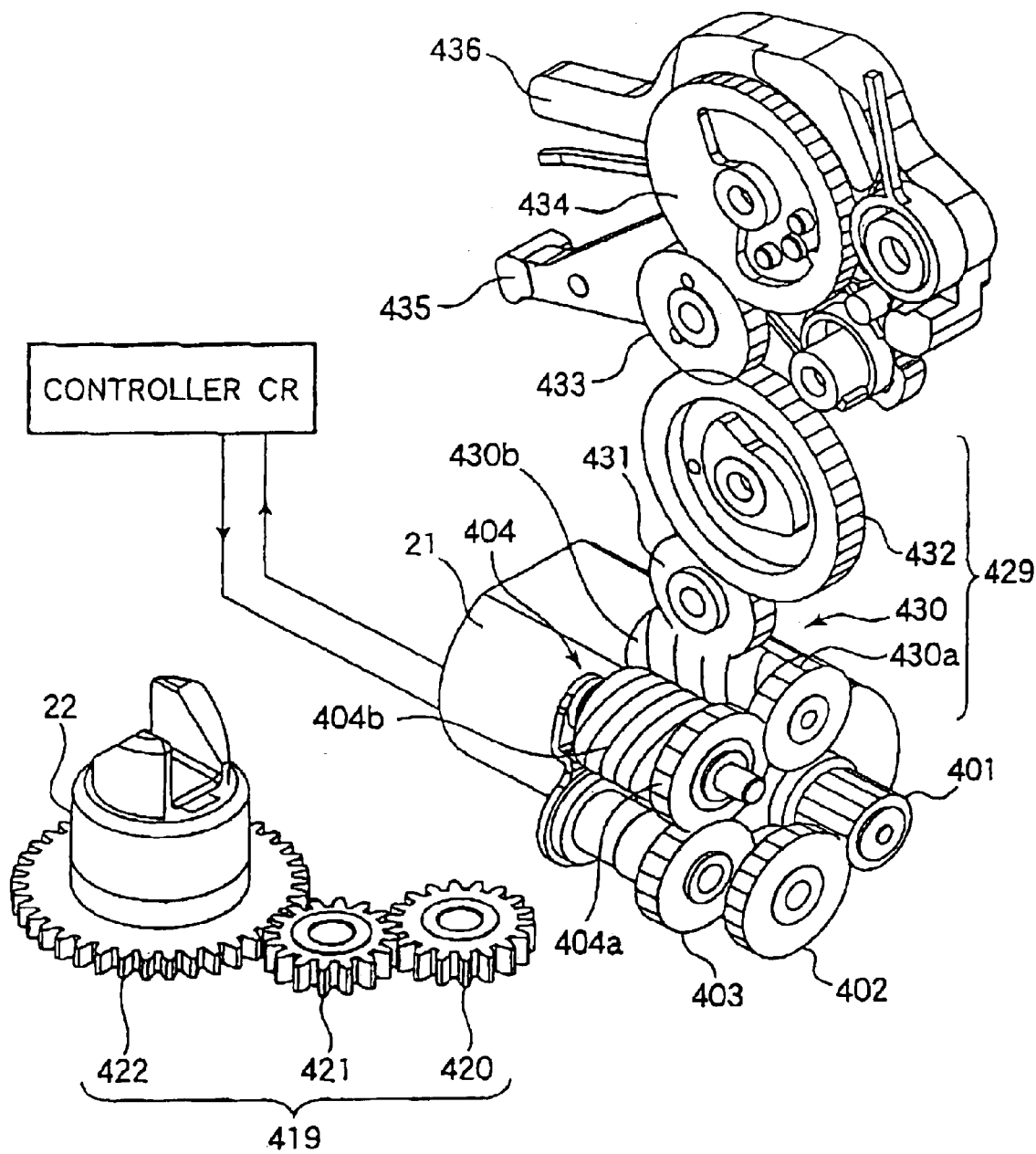
FIG. 14 is a perspective view which shows the gear train of the second speed reducing mechanism, a shutter driving mechanism, and a mirror driving mechanism, when either a photographing operation or a preview operation is performed.

When the planet worm 404 of the second change mechanism 23 is fixed at the position as shown in FIG. 7, namely the planet worm 404 is positioned adjacent to the lens mount 5, the spur gear portion 404a of the planet worm 404 is engaged with the spur gear portion 430a of the charge worm gear 430 of the second gear train 429, as shown in FIG. 14. The second gear train 429 includes the charge worm gear 430, a gear 431, and a diaphragm control gear 432 which is a cam gear. The gear 431 is engaged with a worm wheel portion 430b of the charge worm gear 430, and the diaphragm control gear 432 is engaged with the gear 431. A diaphragm control mechanism (not shown) is connected with the diaphragm control gear 432. The forward rotation of the second motor 21 is transmitted to the diaphragm control mechanism through the above-mentioned gear train of the second speed reducing mechanism D2 and the second gear train 429. Note that, the diaphragm control mechanism is explained later.

An idle gear 433 is engaged with the diaphragm control gear 432, and a gear 434 is engaged with the idle gear 433. After being transmitted to the gear 434 through the gear train of the second speed reducing mechanism D2, and the second gear train 429, and the idle gear 433, the forward rotation of the second motor 21 is transmitted to a shutter charge lever 435 and a mirror drive lever 436. Accordingly, by rotating the second motor 21 in the forward direction in the situation where the planet worm 404 is fixed at the position shown in FIG. 7, the shutter and the quick-return-mirror are driven.

Figure 15:
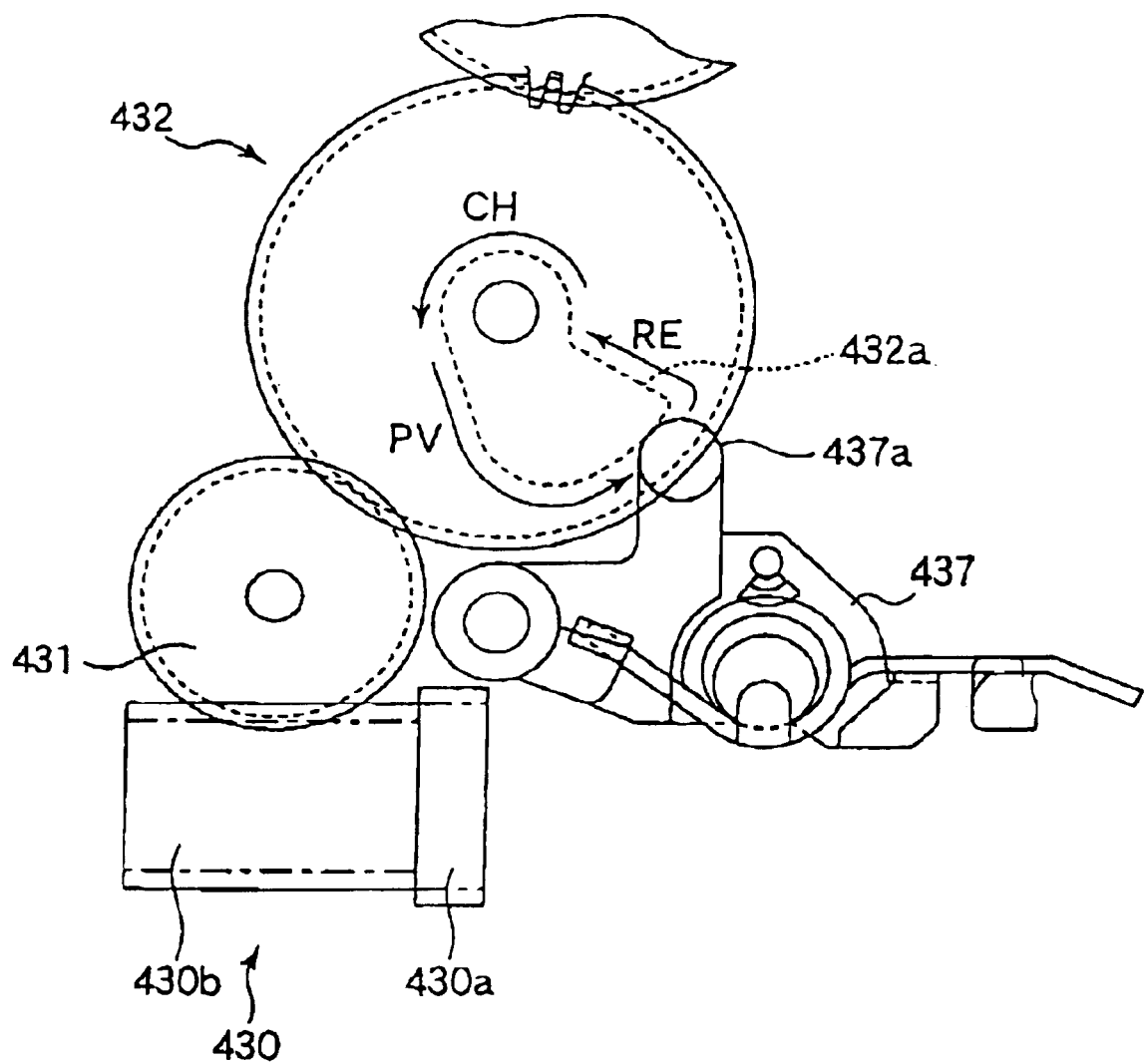
FIG. 15 is a view which shows the planet gear and the diaphragm control lever.

FIG. 15 is a front view which partially shows the gear train shown in FIG. 14. A rotating cam 432a is formed on a plane portion of the diaphragm control gear 432. The diaphragm control lever 437 includes a cam follower 437a which is moved in accordance with the movement of the rotating cam 432a. In the photographing (release) operation, the second motor 21 is rotated in the forward direction based on the controller CR (see FIG. 8), in the situation where the planet worm 404 is fixed at the position as shown in FIG. 7. Accordingly, the diaphragm control gear 432 is rotated in the clockwise direction in FIG. 15.

In the photographing operation, the rotation of the second motor 21 is controlled such that the cam follower 437a is moved along an area RE of the rotating cam 432a. The diaphragm control lever 437 is driven in accordance with the movement of the cam follower 437a, and the diaphragm is stopped down. Then, the quick return mirror 6 is raised, and the shutter is driven.

After the driving of the shutter is finished, the second motor 21 is rotated more in the forward direction based on the control of the controller CR, the diaphragm control gear 432 is rotated more in the clockwise direction, and then the gear 432 returns to the position shown in FIG. 15.

Note that, while the cam follower 437a is in contact with the area CH during the rotation of the gear 432, the shutter charge is carried out and the quick return mirror 6 returns to its original position. After the cam follower 437a passes through an area next to the area CH, the diaphragm which is stopped down is opened. Namely, by rotating the diaphragm control gear 432 one time, the photographing operation and shutter charge are carried out and the shutter and the diaphragm are prepared for the next photographing.

When the second motor 21 is rotated in the reverse direction, based on the control of the controller CR, in the situation where the planet worm gear 404 is positioned as shown in FIG. 7, the diaphragm control gear 432 is rotated in the counterclockwise direction in FIG. 15, and the cam follower 437a is moved along the rotating cam 432a. During the preview operation, the rotation of the second motor 21 is controlled such that the cam follower 437a is moved along an area PV of the rotating cam 432a. In accordance with the movement of the cam follower 437a along the area PV, the diaphragm control lever 437 is driven, so that the diaphragm is controlled. After the preview operation, the second motor 21 is rotated in the forward direction and the cam follower 437a is moved back to the position shown in FIG. 15.

A cylindrical cam (not shown) is formed on the plane portion of the gear 434. The radius of the cylindrical cam is fixed and the cam is formed such that when the gear 434 is rotated at a predetermined rotating angle, the positions of the levers 435 and 436 are not changed. The controller CR controls the rotation angle of the gear 434 based on the output of a sensor unit which includes a brush (not shown) formed on the gear and a code plate (not shown) which is positioned so as to face the brush. On the other hand, the cam 432a of the gear 432 is formed such that the lever 437 is driven in the above-mentioned manner. Accordingly, when the planet worm 404 is positioned as shown in FIG. 7 and the second motor 21 is rotated in the reverse direction while controlling the rotation angle of the gear 434 at the predetermined angle, the shutter and the quick return mirror 6 are not driven, and only the control of the diaphragm is performed. Namely, while keeping the mirror 6 down, only the control of the diaphragm is performed. Accordingly, confirmation of the size of the opening of the diaphragm through the finder, namely the preview operation, is possible.

Due to the worm wheel portion 403b of the worm gear 430, a speed reduction ratio which is larger than that of a speed reducing mechanism including a plurality of gears is obtained. Namely, the relatively large speed reduction ratio can be obtained by the use of a single component, the worm gear 430. Accordingly, a large speed reducing ratio is obtained without enlarging the size of the speed reducing mechanism.

In the photographing operation and the preview operation, the rewind spur gear 420 is released from its engagement with the worm portion 404b of the planet worm gear 404, and is rotatable in accordance with the rotation of the rewind fork gear 422 and the rewind idle gear 432. Accordingly, when the film is rewound, the rotation of the rewind fork gear is not prevented. Namely, the film rewinding is smoothly carried out.

As described above, when the planet worm gear 404 is positioned adjacent to the cartridge room 20 and the worm portion 404b is engaged with the rewind spur gear 420, the reverse rotation of the second motor 21 is used for rewinding the film. Further, when the plane worm gear 404 is positioned adjacent to the lens mount 5 and the spur gear portion 404a is engaged with the spur gear portion 430a of the charge worm gear 430, the forward direction of the motor 21 is used for driving the shutter in the preview operation. In this situation, the second motor 21 rotated in the reverse direction is used for driving the quick return mirror 6, the shutter, and the diaphragm in the photographing operation. Namely, the second motor 21 is effectively used as the driving source of the various operations. Accordingly, an increase in the number of components is reduced, so that the camera can be wholly compact.

Note that, in this embodiment, the planet worm gear 404 includes the spur gear portion 404a and the worm portion 404b. However, the structure of the planet worm gear 404 is not restricted to this structure. For example, both the portion which is connected to the first gear train 419 and the portion which is connected to the second gear train 429 may be a worm gear.

As described above, according to the present invention, the mechanism of changing the transmitting path of the rotational force of the motor includes the planet worm gear on which the worm portion is formed, and the rotational force is transmitted to the film rewinding mechanism through the worm portion. Accordingly, the rotational force of the motor can be transmitted having a large speed reducing ratio, and further the camera can be compact.

The present disclosure relates to subject matter contained in Japanese Patent Application No. 2003-040128 (filed on Feb. 18, 2003) which is expressly incorporated herein, by reference, in its entirety.

What is claimed is:

1. A camera comprising:

a motor;

a first gear train that is engaged with a rewinding fork of a cartridge chamber to transmit a rotational force of said motor to said rewinding fork;

a second gear train that transmits said rotational force to one of a quick return mirror driving mechanism and a shutter driving mechanism; and a changing mechanism that changes a transmission path of said rotational force between said first gear train and said second gear train;

wherein said changing mechanism includes:

a pinion gear that is fixed on a rotation shaft of said motor;

a sun gear to which a rotation of said pinion gear is transmitted;

a planet worm that includes a spur gear portion which is engaged with said sun gear, and a worm portion which is unitarily rotated with said spur gear portion and which is configured to selectively move about a shaft of said sun pear to engage one of said first gear train and said second gear train in accordance with a rotational direction of said sun gear.

2. A camera according to claim 1, wherein said changing mechanism includes a guiding mechanism that guides the movement of said planet worm and a lock mechanism that restrains the movement of said planet worm.

3. A camera according to claim 2, further comprising a controller that controls said motor and said lock mechanism, wherein said controller controls release of said lock mechanism when said planet worm is moved, said planet worm being guided by said guiding mechanism to change a gear train connected to said planet worm, said controller controls transmission of the rotational force of said motor to said rewinding fork of said cartridge chamber and controls film rewinding, by rotating said motor in a first direction in a first state in which said planet worm is connected to said first gear train and the movement of said planet worm is restrained by said lock mechanism, said controller controls transmission of said rotational force of said motor to one of said quick return mirror driving mechanism and said shutter driving mechanism through said second gear train, by rotating said motor in a second direction opposite to said first direction in a second state in which said planet worm is connected to said second gear train and the movement of said planet worm is restrained, and said controller controls the transmission of said driving force to a diaphragm driving mechanism and carries out a preview operation by rotating said motor in said first direction in said second state.

4. A camera according to claim 3, wherein said guiding mechanism includes a guide member having a slit, for guiding a rotating shaft of said planet worm when said planet worm is moved, said lock mechanism includes: a lever that includes first and second stoppers for limiting movement of said rotating shaft of said planet worm; and a lever driving mechanism that drives said lever such that said first and second stoppers are moved to a first position at which said first and second stoppers prevent movement of said rotating shaft in said slit and a second position at which movement of said rotating shaft in said slit is not prevented by said first and second stoppers, said planet worm is moved to a position at which said planet worm is connected to said first gear train, when said lever is driven by said lever driving mechanism such that said first stopper is removed from said slit and said motor is rotated in said first direction, and said planet worm is moved to a position at which said planet worm is connected to said second gear train, when said lever is driven by said lever driving mechanism such that said second stopper is removed from said slit and said motor is rotated in said second direction.

5. A camera according to claim 2, wherein said second gear train includes: a worm gear that includes a spur gear portion configured to engage with said spur gear portion of said planet worm and a worm wheel portion which is unitarily formed with the spur gear portion of the worm gear, a gear that is engaged with said worm wheel portion of said worm gear; and a cam gear that is engaged with said gear and includes a cam plane on a rotating shaft of said cam gear;

said cam gear is connected to a third gear train for transmitting a driving force to said quick return mirror driving mechanism and said shutter driving mechanism, and is connected to a diaphragm driving mechanism, the rotational movement of said motor in said second direction, transmitted by said changing mechanism, said worm gear, and said gear, is transmitted to said third gear train and said diaphragm driving mechanism by said cam gear, and the rotational movement of said motor in said first direction, transmitted by said changing mechanism, said worm gear, and said gear, is transmitted to said diaphragm driving mechanism by said cam gear.

6. A camera according to claim 4, wherein said lock mechanism includes a lever movement limiting mechanism that limits a range of movement of said lever.

7. A camera comprising:

a motor;

a first gear train that is engaged with a rewinding fork of a cartridge chamber to transmit a rotational force of said motor to said rewinding fork;

a second gear train that transmits said rotational force to one of a quick return mirror driving mechanism and a shutter driving mechanism; and a changing mechanism that changes a transmission path of said rotational force between said first gear train and said second gear train;

wherein said changing mechanism includes:

a pinion gear that is fixed on a rotation shaft of said motor;

a sun gear, a rotation of said pinion gear being transmitted to said sun gear;

a planet worm that includes a spur gear portion which is engaged with said sun gear, and a worm portion which is unitarily rotated with said spur gear portion and which is configured to selectively move to engage one of said first gear train and said second gear train in accordance with a rotational direction of said sun gear;

a guiding mechanism that guides the movement of said planet worm and a lock mechanism that restrains the movement of said planet worm, said guiding mechanism includes a guide member having a slit, for guiding a rotating shaft of said planet worm when said planet worm is moved;

said lock mechanism including a lever that includes first and second stoppers for limiting movement of said rotating shaft of said planet worm and a lever driving mechanism that drives said lever such that said first and second stoppers are moved to a first position at which said first and second stoppers prevent movement of said rotating shaft in said slit and a second position at which movement of said rotating shaft in said slit is not prevented by said first and second stoppers, wherein said planet worm is moved to a position at which said planet worm is connected to said first gear train, when said lever is driven by said lever driving mechanism such that said first stopper is removed from said slit and said motor is rotated in said first direction, and said planet worm is moved to a position at which said planet worm is connected to said second gear train, when said lever is driven by said lever driving mechanism such that said second stopper is removed from said slit and said motor is rotated in said second direction.

8. A camera according to claim 7, wherein said second gear train includes: a worm gear that includes a spur gear portion configured to engage with said spur gear portion of said planet worm, and a worm wheel portion which is unitarily formed with the spur gear portion of the worm gear, a gear that is engaged with said worm wheel portion of said worm gear; and a cam gear that is engaged with said gear and includes a cam plane on rotating shaft of said cam gear, said cam gear is connected to a third gear train for transmitting a driving force to said quick return mirror driving mechanism and said shutter driving mechanism, and is connected to a diaphragm driving mechanism, the rotational movement of said motor in said second direction, transmitted by said changing mechanism, said worm gear, and said gear, is transmitted to said third gear train and said diaphragm driving mechanism by said cam gear, and the rotational movement of said motor in said first direction, transmitted by said changing mechanism, said worm gear, and said gear, is transmitted to said diaphragm driving mechanism by said cam gear.

9. A camera according to claim 7, wherein said lock mechanism includes a lever movement limiting mechanism that limits a range of movement of said lever.

10. A camera comprising:

a motor having a rotation shaft;

a first gear train engaged with a rewinding fork to transmit a rotational force of said motor to said rewinding fork;

a second gear train that transmits the rotational force of said motor to one of a quick return mirror driving mechanism and a shutter driving mechanism; and a changing mechanism that changes a transmission path of the rotational force between said first gear train and said second gear train, said changing mechanism comprising:

a pinion gear that is fixed to the rotation shaft of said motor;

a sun gear to which a rotation of said pinion gear is transmitted;

a planet worm that includes a spur gear portion which is engaged with said sun gear, and a worm portion which is rotated together with said spur gear portion and which is configured to selectively move to engage one of said first gear train and said second gear train in accordance with a rotational direction of said sun gear;

a guiding mechanism that guides the movement of said planet worm, said guiding mechanism including a guide member having a slit for guiding movement of a rotating shaft of said planet worm when said planet worm moves.

* * * * *